INVENTOR
ELBERT P. CARTER

BY Claude L. Beaudoin

ATTORNEY

United States Patent Office 3,474,292
Patented Oct. 21, 1969

3,474,292
METHOD OF REDUCING ELECTROSTATIC CHARGES ON FILM STRUCTURES
Elbert P. Carter, Wilmington, Del., assignor to E. I. du Pont de Nemours and Company, Wilmington, Del., a corporation of Delaware
Filed Mar. 1, 1966, Ser. No. 530,936
Int. Cl. H05f 3/04
U.S. Cl. 317—2                                        4 Claims

ABSTRACT OF THE DISCLOSURE

Film structures of organic polymeric material which are subjected to an electrostatic discharge to render the surface adherable while one surface is in contact with a dielectric, are separated from the dielectric and passed in close contact with an electrostatic charge removal device such as a static discharge bar.

---

The present invention relates to a method for reducing the electrostatic charges on film structures of synthetic organic polymeric material and, more particularly, is directed to a method for removing or reducing the level of electrostatic charges on synthetic organic polymeric films which result from the electrical discharge treatment of such films.

The electrical discharge treatment of organic thermoplastic polymeric structures such as, for example, subjecting the surface of polyethylene film to the action of an electrical discharge, is now a well-known method for rendering the surfaces of such structures adherable to a wide variety of materials as, for example, printing inks, adhesives and coating compositions. In practice, such treatment may be performed by passing a sheet or film of organic thermoplastic polymeric material at a suitable rate such as between about 10 and 300 feet per minute over and in contact with an electrically grounded metal drum while the surface of the sheet or film away from the drum passes under and in close proximity to an electrode that is connected to a source of high frequency alternating potential and which is suitably spaced, for example, between about 0.010 and 0.025 inch, from the film surface. A major drawback and disadvantage attributable to and resulting from the above described method of electrical discharge treatment is that film structures treated in accordance therewith are characterized by poor roll formation. That is, film structures, especially those of thinner gauges, of organic thermoplastic polymeric material so treated when wound into roll form are characterized by numerous wrinkles and, furthermore, by poor runnability in converting machinery, such as for making bags, due to clinging of the film structure to electrically grounded portions of the machinery resulting from an accumulation of electrostatic charges on the surfaces of the film structure. It is, therefore, the principal object of the present invention to provide a method for removing or reducing the level of electrostatic charges on film structures of synthetic organic polymeric material that have been subjected to electrical discharge treatment.

According to the present invention, there is provided a method for treating at least one surface of a film structure of organic polymeric material having one surface thereof in contact with a dielectric surface which comprises subjecting at least one surface of said film structure to the action of an electrical discharge; separating said film structure from said dielectric; and electrically neutralizing said film structure by passing the surface thereof in close proximity to an electrostatic charge removal device.

The nature and advantages of the invention will be more clearly understood by the following description and the several views illustrated in the accompanying drawings wherein like reference characters refer to the same parts throughout the several views and in which.

Figure 1:
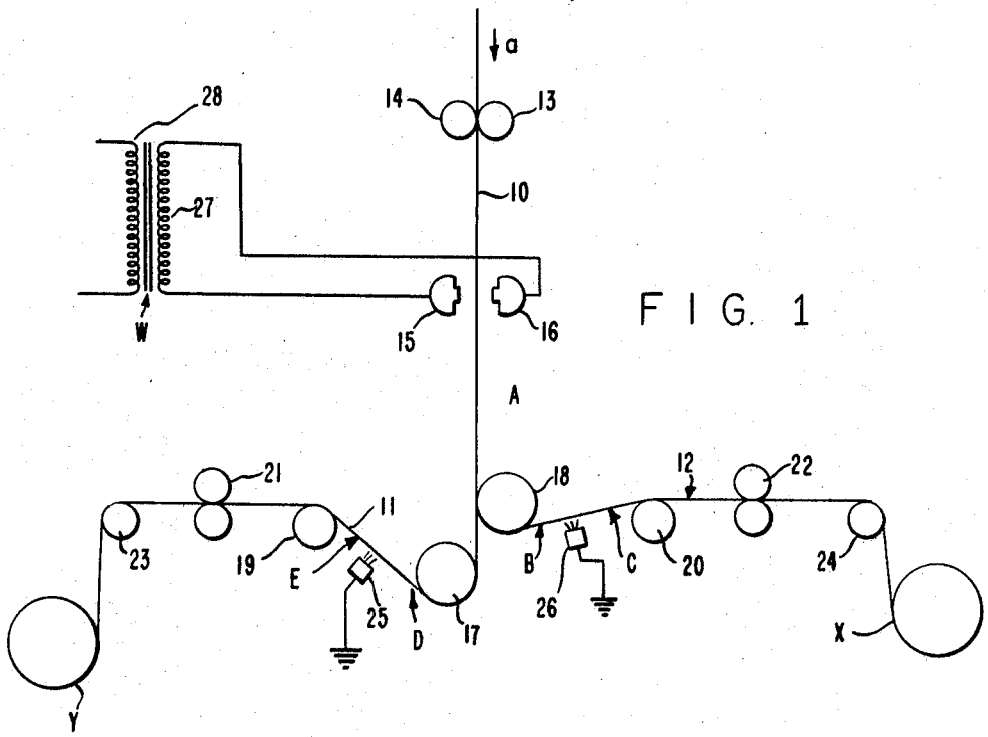
FIGURE 1 illustrates a suitable arrangement of apparatus adapted to accomplish the method of the present invention.

In the electrical discharge treatment apparatus shown in FIGURE 1, a double-sheet web 10 of two contiguous sheets comprising film sheet 11 and film sheet 12, is advanced in the direction of arrow $a$ and passed between nip rollers 13 and 14 which press the sheets into intimate contact and squeeze out the air thereinbetween. Web 10 next passes between electrodes 15 and 16 across which is impressed an electrical discharged voltage which is preferably powered by an alternating voltage in the 3 to 10 kilocycle range derived from transformer W having secondary and primary windings 27 and 28, respectively. The primary windings 28 are connected to a suitable source of high frequency alternating potential, not shown. The spacing between each surface web 10 and electrodes 15 and 16 is approximately 0.030 to 0.040 inch. Each of electrodes 15 and 16 is relatively long and narrow, each having a thickness of approximately 0.5 inch and extending transversely across the entire width of web 10. After exposure of the outer surfaces of web 10 to the action of the electrical discharge from electrodes 15 and 16, the double-sheet web is separated into its component sheets 11 and 12 by passing each sheet over idler rolls 17 and 18, respectively. The separated sheets next each advance over idler rollers 19 and 20, through nip roller sets 21 and 22 and idler rollers 23 and 24, respectively, and each respective sheet is wound into roll form as at X and Y.

Operation of the electrical discharge treatment apparatus illustrated in FIGURE 1 and above described is found to cause film rolls such as X and Y to have severe wrinkles, poor running properties caused by electrostatic cling, and poor printability properties. On the one hand, it has been found that roll wrinkling disappears and the machine runnability improves when operating the apparatus of FIGURE 1 without electrical discharge electrodes 15 and 16 in operation, but, of course, neither is there any treatment obtained of the film surface. On the other hand, it has been found that operating the apparatus of FIGURE 1 with electrical discharge electrodes 15 and 16 in operation results in the aforementioned difficulties.

To illustrate the foregoing, the apparatus of FIGURE 1 above described was utilized for treating a double-sheet web of two polyethylene films each of 0.5 mil thickness traveling at 128 feet per minute by applying a 3 kilocycle alternating voltage to electrodes 15 and 16 to supply thereto a power of approximately 600 watts. The electrostatic charges on the surface of the polyethylene film were measured at locations A, B, C, D and E (in FIGURE 1) with a Kiethley Model 250 electrometer having a Model 2501 head. In separate tests, the electrodes were energized symmetrically with respect to the ground, Test I, and in Test II one electrode was grounded (zero potential). The measurements of the electrostatic charges on the polyethylene film surface at the same locations were repeated without electrodes 15 and 16 in operation. The results are shown in Table I herebelow:

TABLE I

| Location | Electrostatic Charge, kv. | | |
|---|---|---|---|
| | Test I | Test II | No Treatment |
| A | 0 to −0.5 | −1 to −2 | 0 to −5. |
| B | +12 to +25 | +12 to +25 | ±4 to ±5. |
| C | +12 to +25 | +12 to +25 | ±4 to ±5. |
| D | −20 to −30 | −20 to −30 | ±4 to ±5. |
| E | −20 to −30 | −20 to −30 | ±4 to ±5. |

It is apparent from the results tabulated in Table I, especially the low electrostatic charge measured at point A, that the electrical discharge treatment does not itself produce the high level of electrostatic charges measured at locations B, C, D and E. In other words, the high level of electrostatic charges measured at locations B, C, D and E were not deposited solely by the electrodes during the electrical discharge treatment of the double-sheet web. The tabulated results, especially those without electrodes 15 and 16 in operation, also show, on the other hand, that the electrical discharge treatment process is at least partially responsible for the high level of electrostatic charges on the film surfaces at locations B, C, D and E. Thus, it may be postulated although not considered binding, that triboelectric charging occurs on separation of the sheets. This explanation appears plausible since the sheets of the web are brought into more intimate contact during the electrical discharge treatment by reason of the fact that during each half-cycle of the three kilocycle power supplied to the electrodes the outer surface of each film layer of the web is oppositely charged to the peak voltage, attaining potential differences of approximately 10 kv. In the case of a 1 mil thickness web, the peak pressure forcing the two layers thereof together may reach approximately 20 p.s.i. The pressure forcing the layers of the web together is proportional to the square of the voltage difference between the opposite surfaces of the web and inversely proportional to the square of the web thickness. In the case of thicker webs the triboelectric charging should, therefore, be much reduced or nonexistent. Such is actually observed in practice.

As indicated earlier, the high level of electrostatic charges on film surfaces, as above noted, are undesirable because resulting in wrinkled rolls, random reverse side printability and poor machine runnability. It has been found that wrinkles occur as a result of the electrostatic attractions, between the charged film as it moves near conductive bodies and grounded bodies, such as rollers and adjacent parts of film processing apparatus. This attraction, accompanied by random discharging of charged areas causes irregular clinging of the film to the rolls, with varied tension patterns, which ultimately results in wrinkled rolls. It also has been found that reverse side treatment of the film is caused by gaseous discharges occurring as the highly surface charged film comes near grounded conductive bodies. For example, as the highly charged film approaches a grounded roller the voltage gradient exceeds the breakdown threshold and a discharge occurs. The high intensity of the discharge also causes imbedded charges which cannot be readily removed; these more or less permanent charges are readily detectable by means of colored electroscopic powders. The secondary undesirable discharge in effect treats the reverse side of the film causing adhesion thereto of, for example, printing inks when processing the film for printing. The permanently imbedded charges also cause permanent electrostatic cling problems on converting machinery.

The present invention provides a solution to the foregoing problems by removing or reducing to innocuous levels the high surface electrostatic charges before the film comes into close proximity to grounded conductors. As shown in FIGURE 1, the highly charged films 11 and 12 are each caused to pass in close proximity to discharge elements such as at 25 and 26, respectively. Each discharge element 25 or 26 is preferably an inductive static discharge bar, which in its preferred form has a plurality of clusters of fine conductive bristles electrically grounded at their base and mounted approximately one inch apart along a nonconductive bar support, which is mounted transversely of the film in a position to remove the electrostatic charges on the surface thereof. Each static discharge bar is positioned so that the bristles, which are grounded through their bases, are approximately one-fourth inch from the film surface. The location of the electrostatic charge removal device, as 25 and 26, preferably should be as near to the point of separation of the two sheets of the web as practicable, but not too near the next following conductive body or roller, as 19 and 20, which will contact the highly charged surface of the sheet. Generally, approximately six inches from the transfer idler rolls 17 and 18 has been found suitable. Static discharge bars are effective for the removal of electrostatic charges of uniform polarity exceeding about 14 to 15 kv. The static discharge bars are capable of removing the high voltage electrostatic charges from the film surface without actually producing a gaseous discharge in the usual sense, i.e. a luminous breakdown. For example, if the potential of the initial electrostatic charge is in the range of 16 to 20 kv., the residual charge after passage by the discharge element is nearly zero. The static discharge bars may conveniently be the commercially available "Majic Wand" manufactured by Herman H. Sticht Company, New York, N.Y.

The effectiveness of the electrostatic charge reduction and neutralization of the present invention is illustrated by the results tabulated in Table II herebelow for the treatment of a double-sheet of polyethylene in the manner and following the procedure described hereinabove in relation to Table I.

TABLE II

| Location | Electrostatic Charge, kv. | | | |
|---|---|---|---|---|
| | B | C | D | E |
| Static Bars: | | | | |
| With | +12 to +25 | +2 | −20 to −30 | −2. |
| Without | +12 to +25 | +12 to +25 | −20 to −30 | −20 to −30. |

Moreover, after passage of the respective films over rollers 19 and 20, without prior exposure to the induction bars, the film surfaces have random areas of electrostatic charges of random polarity of up to 5 to 10 kv. In direct contrast, no electrostatic charge patterns are observable at these locations when utilizing static discharge bars immediately after separation of the two sheets.

Figure 2:
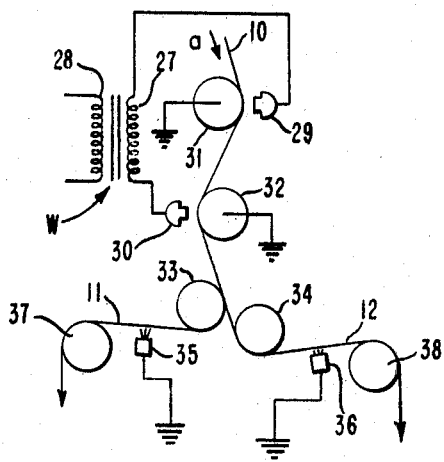
FIGURE 2 illustrates another suitable apparatus adapted to accomplish the method of the present invention.

The method of the present invention is further illustrated by the specific embodiment shown in FIGURE 2 employing opposed electrodes 29 and 30 which are electrically driven symmetrically by being operatively connected to opposite ends of the secondary winding 27 of transformer W, so that the applied voltages are instantaneously of opposite polarity.

As shown in FIGURE 2, each respective outer surface of the double-sheet web 10 is treated in a sequential manner by one of electrodes 29 and 30, as the double-sheet web passes over the respective grounded back-up rollers 31 and 32. The double-sheet web 10 is next separated into its component sheets 11 and 12 by passing each sheet over idler rollers 33 and 34, respectively, and thereafter each sheet passes in close proximity to electrostatic induction discharge elements 35 and 36 which are located so as to discharge the respective inner surface of the sheets before these contact a grounded body, such as idler rollers 37 and 38. Each treated sheet is thereafter wound into roll form.

Figure 3:
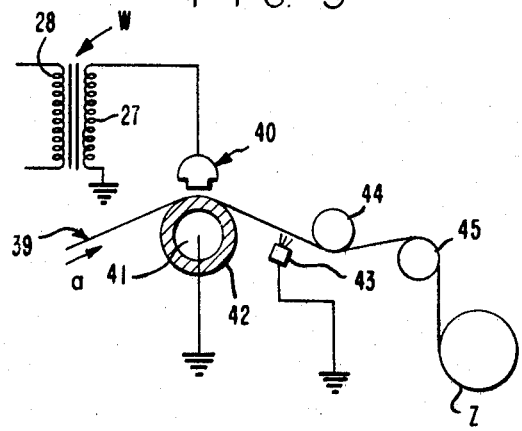
FIGURE 3 illustrates yet another suitable apparatus adapted to accomplish the method of the present invention.

The method of the present invention also is adapted to be practiced utilizing a single sheet as shown in FIGURE 3. As illustrated in FIGURE 3, single sheet 39 is treated by electrode 40 as it passes over and contacts grounded roller 41 having a dielectric cover 42 over the surface thereof. The treated sheet next passes in close proximity to electrostatic induction discharge element 43 which is operatively positioned to remove the electrostatic charge from the surface of the treated sheet essentially immediately after separation of the sheet from dielectric cover 42 and roller 41, and before the sheet contacts a grounded body such as idler rollers 44 and 45. The treated sheet is next wound into roll form as of Z.

What is claimed is:

1. In the method for treating organic polymeric film structures to render at least one surface thereof more adherable wherein at least one surface of said film structure subjected to the action of an electrical discharge while the other surface thereof is in contact with a dielectric surface, the improvement comprising separating said film structure from said dielectric surface and passing said film structure in close proximity to a static discharge bar prior to contacting said film structure with a grounded body and prior to moving said film structure within sparking distance of a grounded body thereby to obtain said film structure substantially free of electrostatic charges on the surface thereof.

2. The method of claim 1 wherein the dielectric surface is the inner surface of a second organic polymeric film structure.

3. The method of claim 1 wherein the dielectric surface is a dielectric covered, grounded roller electrode.

4. The method of claim 1 wherein the synthetic, organic polymeric film is polyethylene.

References Cited

UNITED STATES PATENTS

| 3,392,311 | 7/1968 | Goetemann | 317—2 |
| 3,396,917 | 8/1968 | Carter | 242—55 |
| 2,449,972 | 9/1948 | Beach | 317—2 |
| 3,067,119 | 12/1962 | Ramaika | 250—49.5 X |
| 3,192,385 | 6/1965 | Antokal | 250—49.5 |
| 3,196,270 | 7/1965 | Rosenthal | 250—49.5 |

JOHN F. COUCH, Primary Examiner

DENNIS J. HARNISH, Assistant Examiner

U.S. Cl. X.R.
250—49.5; 317—262